UNITED STATES PATENT OFFICE.

WILLIAM R. WALKER, OF NEW YORK, N. Y.

PRODUCING STEEL AND HIGH-PHOSPHORUS SLAG.

1,299,072.

Specification of Letters Patent.

Patented Apr. 1, 1919.

No Drawing.

Application filed October 7, 1914. Serial No. 865,504.

*To all whom it may concern:*

Be it known that I, WILLIAM R. WALKER, a citizen of the United States, residing in the city, county, and State of New York, have invented certain new and useful Improvements in Producing Steel and High-Phosphorus Slag, of which the following is a specification.

It has heretofore been proposed to manufacture steel and at the same time to secure a slag rich in soluble phosphates for use as a fertilizer. The processes proposed contemplate the refining in an open-hearth or an electric furnace of pig iron containing a high percentage of phosphorus or of a mixture of such pig iron with scrap, using a lime slag.

With the iron ore of foreign countries containing a comparatively high content of phosphorus such processes have been found practicable and economical. But most of the ores of this country are low in phosphorus compared with the phosphoric ores of Europe. Consequently, the pig iron from these compartively low phosphorus ores has not contained enough phosphorus to produce a slag rich in phosphates.

According to this invention I propose a method by which the slag will be made richer in phosphates than if the pig iron were converted into steel directly in the open-hearth or electric furnace. This will make it possible to secure a slag commercially available as a fertilizer from comparatively low phosphorus ore or pig iron; and will increase the percentage of soluble phosphates which can be secured in slags from ores or pig of high phosphorus content. The lowest content of soluble phosphate of lime at which the slag is commercially available as a fertilizer is about twelve of thirteen per cent. With comparatively low phosphorus pig iron I have secured a slag running considerably higher than this in soluble phosphates.

American pig iron generally contains about 1.25 per cent. of silicon and about .2 per cent. of phosphorus, these percentages being widely varied. The silicon content will vary with the heat at which the smelting operations are carried on, and the purposes for which the pig iron is to be used. The phosphorus content will vary depending upon the character of the ore used in the smelting operation which varies with the district from which it is obtained. The pig iron which I have used in carrying out this process contains .9 per cent. of phosphorus. In every case, however, the pig iron contains a substantial percentage of silicon. When this pig iron is transferred directly to the basic-open-hearth and refined there, the high silicon content of the iron affects the percentage of phosphate which can be secured in the slag. A lime and ore slag is used. The lime combines with both the silicon and the phosphorus. Consequently, enough lime must be used to extract the silicon and also to extract the phosphorus. Silicon in the metal, therefore, means not only additional silica in the slag but additional lime in the slag; and in order to get out all or nearly all the phosphorus from the metal the slag has to be extremely voluminous under these conditions, and the percentage of phosphate is too low for a fertilizer.

I propose to first desiliconize the pig iron before extracting the phosphorus. The desiliconizing may be performed in any usual or suitable way. The silicon should be reduced to less than one-half of one per cent., and preferably should be eliminated entirely. For this purpose an acid Bessemer converter may be used or the pig iron may be treated in any other intermediate vessel with a suitable slag; as, for example, in an acid open-hearth furnace or mixer with an acid slag of sand and ore. With an acid Bessemer converter practically all of the silicon contained can be removed from the pig iron without substantially reducing the phosphorus.

It is of great importance that all silicious slag resulting from this bessemerizing operation should be separated from the desiliconized metal, because should any silicious slag be carried with the molten metal into the refining or finishing furnace, the silica contained in that slag will displace phosphoric acid in the phosphoric slag which it is desired to obtain, the same as if the silica were obtained from the oxidation of silicon from the pig iron in the finishing furnace as is described above. This bessemerized product is then transferred to the open-hearth or electric furnace and refined with a basic slag which rapidly takes up phosphorus. When the slag contains the greater part of the phosphorus to be extracted this slag is withdrawn and a second or finishing slag is added to complete the refining operation. The second slag will contain a very much lower percentage of phosphates than the first slag, and the first slag will be correspondingly richer in phosphates than if a single slag had been used for the removal of the entire quantity of phosphorus to be extracted.

For convenient removal of the phosphoric slag it is preferable to use tilting furnaces having lips over which the slag can be run into cars or other receptacles and conveyed to suitable bins or grinding machines for reducing it to the best size for use as a fertilizer.

At the completion of the refining operation in the open-hearth or electric furnace the metal may be poured into ladles and treated with manganese or other deoxidizing and finishing materials as usual and transferred to the molds. Preferably the final slag, containing too small a percentage of phosphates to be directly available as a fertilizer, is separated and transferred to the charge in the smelting furnace, with which it is mixed. This slag contains oxid of iron and lime, both of which are useful in making up the charge in the smelting furnace. It has also the advantage in connection with this invention of restoring to the charge the phosphorus which could not be economically extracted in the refining operation. It follows that the complete process will result in securing in the slag all the phosphorus in the ore (minus only the insignificant quantities which remain in the finished steel) and of extracting the same in a slag of the highest possible phosphate content; a residuum of phosphorus remaining continually in circulation in the plant.

Working the above process on a pig iron containing 0.9 per cent. phosphorus and 1.25 per cent. silicon, I first reduced this by an acid Bessemer operation to a metal containing one per cent. phosphorus and only traces of silicon. And from this metal I secured in the open-hearth operation a slag containing 18.27 per cent. of phosphoric acid ($P_2O_5$) soluble in citric acid, this being the usual commercial test of the solubility and value as a fertilizer.

In practice the first slag in the open-hearth furnace cannot easily be entirely removed, and it is not essential that it be entirely removed. One-half to two-thirds of this slag may be removed. More lime is added and this combining with the portion of the first slag remaining on the metal makes a final slag of lime and oxid similar to the first. This final slag takes out the remaining percentage of phosphorus which has to be removed.

In carrying out the process in the electric furnace, which is preferably of the Heroult arc type, certain changes have to be introduced owing to the neutral or deoxidizing condition of the atmosphere. The final slag should contain an addition of coke dust. This reduces the oxid so that the final slag takes out no phosphorus. The first slag must, therefore, be continued until the phosphorus extraction is completed. Or the dephosphorizing operation may be carried on with two slags, one for roughing and one for finishing; after which the final slag with coke dust is used. In this operation generally only the roughing slag will contain a sufficient percentage of soluble phosphate to be valuable as a fertilizer, but the second or finishing dephosphorizing slag may be run through the plant without loss.

When using a pig iron containing only .2 per cent. to .3 per cent. of phosphorus a portion of the open hearth plant, say one quarter of the furnaces, may be used to produce steel and a high phosphoric slag, while the slag from the remainder of the open hearth plant, say three-quarters of the furnaces, may be returned to the smelting furnaces to increase the phosphorus in the pig iron, which phosphorus is recovered in the open hearth furnaces used especially for producing high phosphoric slag.

Instead of using the metal completely desiliconized in the Bessemer converter, I may further modify the composition of this metal by recarburizing it by the addition of a small percentage of pig iron or other carburizing material; as described for example in my Patent No. 1,014,425 of January 9, 1912. For example: Molten pig iron in volume equal to one-tenth may be added to the pig iron in the converter after the blowing operation or may be added in the ladle during the transfer from the converter to the open-hearth. This introduces a very slight additional percentage of silicon. It has the advantage that the recarburized metal remains liquid longer than the blown metal so as to avoid skulling in the ladle. It has the further advantage that the metal brought to the open hearth is practically steel with a high percentage of phosphorus so that the open-hearth furnace has nothing to do but to extract the phosphorus. The resulting steel will be of the highest quality, equivalent to that which is obtained in basic open-hearth furnaces working on a high percentage of steel scrap; the product produced by mixing the Bessemer metal and the pig iron being practically as good as scrap.

Though I have described with great particularity of detail certain specific embodiments of my invention, yet it is not to be understood therefrom that the invention is limited to the specific embodiments described. Various modifications may be made by those skilled in the art without departing from the invention as defined in the following claims.

What I claim is—

1. The process of producing steel and a slag rich in phosphates which consists in desiliconizing pig iron without substantially reducing the percentage of phosphorus and refining the desiliconized metal with a basic slag, and removing the slag before the end of the refining operation and when it contains the greater part of the phosphorus to be extracted.

2. The process of producing steel and a slag rich in phosphates which consists in smelting the ore and forming pig iron, desiliconizing such iron to reduce the silicon content without substantially reducing the percentage of phosphorus, and refining the desiliconized metal with a basic slag, removing the slag before the end of the refining operation and when it contains the greater part of the phosphorus to be extracted, adding slag-forming materials to complete the refining operation and transferring the final slag to the charge in the smelting furnace.

3. The process of producing steel and a slag rich in phosphates which consists in desiliconizing pig iron without substantially reducing the percentage of phosphorus, thoroughly separating all silicious slag from the desiliconized metal, and refining the desiliconized metal with a basic slag, and removing the slag before the end of the refining operation and when it contains the greater part of the phosphorus to be extracted.

4. The process of producing steel and a slag rich in phosphates which consists in smelting the ore and forming pig iron, desiliconizing such iron to reduce the silicon content without substantially reducing the percentage of phosphorus, thoroughly separating all silicious slag from the desiliconized metal, and refining the desiliconized metal with a basic slag, removing the slag before the end of the refining operation and when it contains the greater part of the phosphorus to be extracted, adding slag-forming materials to complete the refining operation and transferring the final slag to the charge in the smelting furnace.

5. The process of producing steel and a slag rich in phosphates, which consists in desiliconizing pig iron without substantially reducing the percentage of phosphorus, recarburizing the desiliconized metal, refining it with a basic slag, and removing the slag before the end of the refining operation and when it contains the greater part of the phosphorus to be extracted.

6. The process of producing steel and a slag rich in phosphates, which consists in bessemerizing pig iron to reduce the silicon content without substantially reducing the percentage of phosphorus, adding pig iron to the bessemerized metal to substantially convert it into steel with a high phosphorus content, refining it with a basic slag, and removing the slag before the end of the refining operation and when it contains the greater part of the phosphorus to be extracted.

7. The process of producing steel and a slag rich in phosphates which consists in smelting ore and forming pig iron, desiliconizing the pig iron without substantially reducing the percentage of phosphorus, refining the desiliconized metal with a basic slag, transferring a part of the slag so used to the charge in the smelting furnace and thus increasing the phosphorus content of the pig iron and of the slag in subsequent refining operations.

8. The process of producing steel and a slag rich in phosphates which consists in desiliconizing pig iron without substantially reducing the percentage of phosphorus, removing the resulting high silica slag and refining the desiliconized metal with a basic slag, and removing the slag before the end of the refining operation and when it contains the greater part of the phosphorus to be extracted.

In witness whereof, I have hereunto signed my name in the presence of two subscribing witnesses.

WILLIAM R. WALKER.

Witnesses:
D. ANTHONY USINA,
LULU STUBENVOLL.